US010365084B2

(12) United States Patent
Little et al.

(10) Patent No.: US 10,365,084 B2
(45) Date of Patent: Jul. 30, 2019

(54) BEAD MEASUREMENT SYSTEM

(71) Applicant: Bartell Machinery Systems, L.L.C., Rome, NY (US)

(72) Inventors: Nathan Jeremy Little, Whitesboro, NY (US); Douglas Maxwell Sassaman, Rome, NY (US); Collin McLaughlin Sears, Cortland, NY (US)

(73) Assignee: Bartell Machinery Systems, L.L.C., Rome, NY (US)

( * ) Notice: Subject to any disclaimer, the term of this patent is extended or adjusted under 35 U.S.C. 154(b) by 101 days.

(21) Appl. No.: 15/429,782

(22) Filed: Feb. 10, 2017

(65) Prior Publication Data

US 2017/0234677 A1 Aug. 17, 2017

Related U.S. Application Data

(60) Provisional application No. 62/294,733, filed on Feb. 12, 2016.

(51) Int. Cl.
| | |
|---|---|
| *H04N 5/247* | (2006.01) |
| *G01B 11/02* | (2006.01) |
| *G01M 17/02* | (2006.01) |
| *B29D 30/06* | (2006.01) |
| *G01B 11/06* | (2006.01) |

(Continued)

(52) U.S. Cl.
CPC ........ *G01B 11/02* (2013.01); *B29D 30/0061* (2013.01); *B29D 30/0681* (2013.01); *G01B 11/026* (2013.01); *G01B 11/0608* (2013.01); *G01B 11/08* (2013.01); *G01M 17/02* (2013.01); *G01M 17/027* (2013.01); *H04N 5/247* (2013.01); *B29D 2030/0066* (2013.01)

(58) Field of Classification Search
CPC ........ H04N 5/247; G01B 11/02; G01B 11/08; G01B 11/026; G01B 11/0608; G01M 17/02; B29D 30/0681; B60C 15/00
See application file for complete search history.

(56) References Cited

U.S. PATENT DOCUMENTS

| | | | |
|---|---|---|---|
| 7,738,120 B2 * | 6/2010 | Braghiroli | ........... B60C 25/0554 356/614 |
| 8,537,347 B1 * | 9/2013 | Clasquin | ............. B60C 25/0554 356/139 |

(Continued)

FOREIGN PATENT DOCUMENTS

| | | | |
|---|---|---|---|
| CN | 102305599 A | * | 1/2012 |
| CN | 102305599 A | | 1/2012 |

(Continued)

OTHER PUBLICATIONS

International Search Report and Written Opinion dated May 22, 2017 for PCT Application No. PCT/2017/017322 (14 pp.).

*Primary Examiner* — Tsion B Owens
(74) *Attorney, Agent, or Firm* — Brinks Gilson & Lione

(57) ABSTRACT

The current embodiments provide a system for determining a parameter of a tire component. The system may have a background surface, a first measurement device configured to measure a dimension with respect to the reference surface and a support surface located at least partially between the first measurement device and the reference surface, where the support surface is configured to support the tire component. The parameter may correspond to the dimension on the background surface.

18 Claims, 4 Drawing Sheets

(51) Int. Cl.
*G01B 11/08* (2006.01)
*B29D 30/00* (2006.01)

(56) References Cited

U.S. PATENT DOCUMENTS

| | | | | |
|---|---|---|---|---|
| 8,872,640 B2* | 10/2014 | Horseman | ............ | B60W 40/08 |
| | | | | 340/425.5 |
| 9,109,974 B2* | 8/2015 | Takahashi | ............ | G01B 11/245 |
| 2011/0102811 A1* | 5/2011 | Kaneko | ............ | G01B 11/0608 |
| | | | | 356/625 |

FOREIGN PATENT DOCUMENTS

| | | | |
|---|---|---|---|
| DE | 10 2014 213289 A1 | | 1/2016 |
| JP | 07-39827 | | 2/1995 |
| JP | 07039827 | * | 10/1995 |
| WO | WO 92/07234 | | 4/1992 |

\* cited by examiner

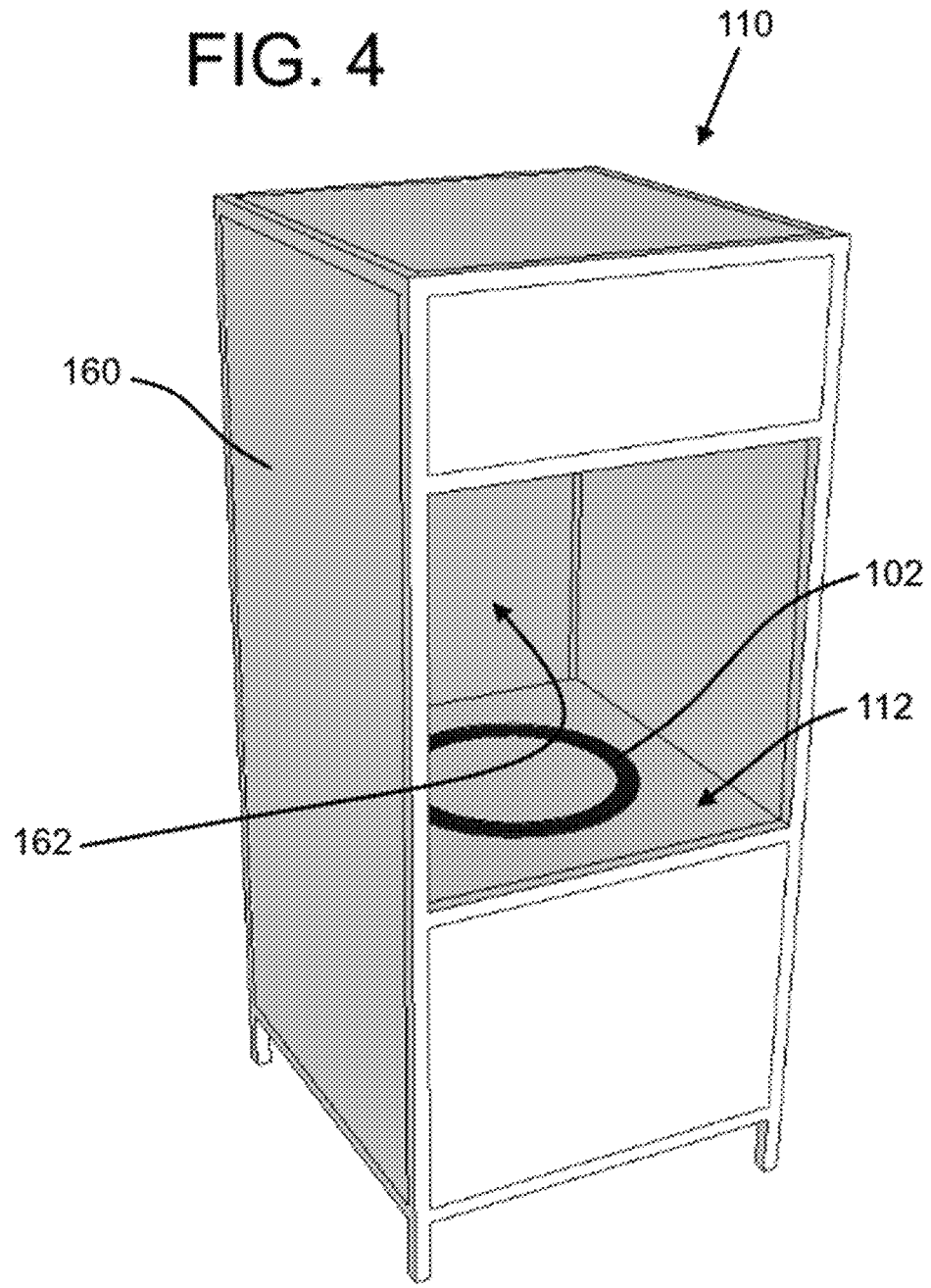

BEAD MEASUREMENT SYSTEM

CROSS REFERENCE TO RELATED APPLICATIONS

This application claims priority to U.S. provisional application Ser. No. 62/294,733 filed Feb. 12, 2016, which is herein incorporated by reference in its entirety.

BACKGROUND

A vehicle tire generally has two annular bead rings at the innermost diameter, which provide the tire with hoop strength and structural integrity. The beads also provide stiffness at the point where the tire mounts to a rim. Beads are generally manufactured by winding metal wire in a groove on the outer periphery of a chuck or drum, often called a former. A bead may also be formed from a single wire.

Often, a single manufacturing facility may produce several types of beads with varying sizes and shapes. Several parameters of the beads are generally measured after the manufacturing process for purposes of quality control to ensure a high-quality final product. For example, certain parameters of the beads often must fall within a tolerance of 0.005 inches to meet the established quality standards. Parameters that are typically measured may include the inner diameter, height, width, and weight of the tire bead. Some existing measurement devices contact the tire bead when taking a measurement, thereby potentially distorting the tire bead during the measurement and potentially hiding defects.

It is therefore desired to provide an accurate and precise measurement system that can measure a variety of types and sizes of tire beads without undue contact to the tire bead during the measurement process.

BRIEF DESCRIPTION

The current embodiments provide a system for determining a parameter of a tire component. The system may have a background surface, a first measurement device configured to measure a dimension on the background surface and a support surface located at least partially between the first measurement device and the background surface, where the support surface is configured to support the tire component. The parameter may correspond to the dimension on the background surface.

The measurement device may have a first camera with an entocentric lens.

The system may include a second measurement device configured to directly determine a second parameter of the tire component.

The second measurement device may include a second camera having a telecentric lens.

A third measurement device may include a third camera with a telecentric lens, where the third measurement device is configured to determine a third parameter of the tire component.

At least one load cell may be positioned at least partially between the background surface and the support surface. The at least one load cell may be configured to measure the weight of the tire component.

The system may include a transparent body defining the support surface.

The system may have at an abutment surface, wherein the abutment surface is configured to locate the tire component in a measurement position.

BRIEF DESCRIPTION OF THE DRAWINGS

FIG. 4 shows a perspective view of a system for determining a parameter of a tire component with a body having a cavity.

DETAILED DESCRIPTION

Figure 1:
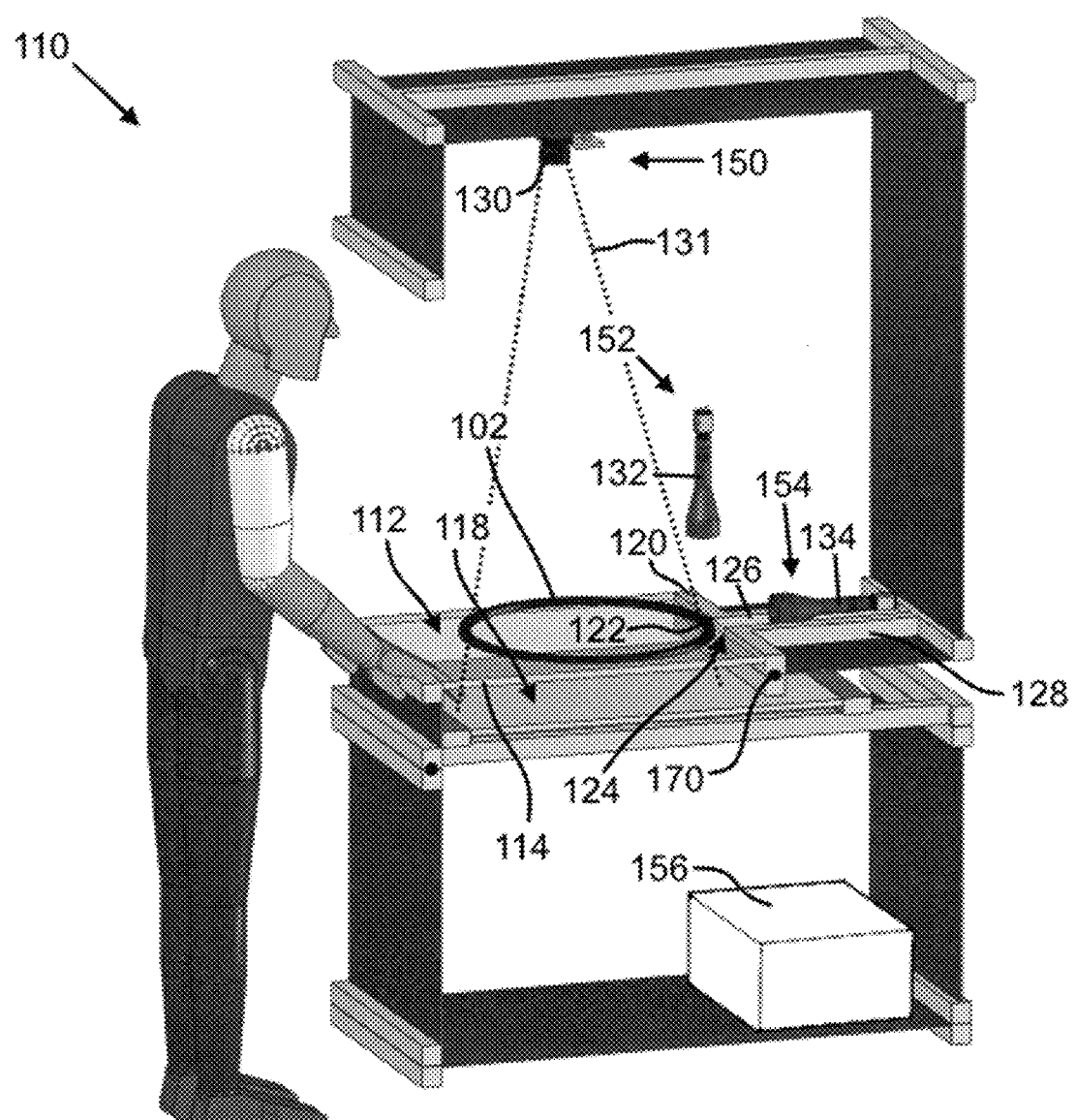
FIG. 1 shows a perspective view of an embodiment of a system for determining at least one parameter of a tire component.

FIG. 1 shows a system 110, which may be configured to determine one or more parameters of a tire component. The tire component may be, for example, an annular body, such as a tire bead 102. The system 110 may alternatively or additionally be configured to determine parameters of other circular or annular bodies (or bodies of another shape).

The system 110 may include a support surface 112 configured to support the tire bead 102 (or another component). The support surface 112 may be defined by a transparent body 114, such as a sheet of glass, a sheet of transparent plastic, etc. In exemplary embodiments, the transparent body 114 is a sheet of low impurity glass (for example, an ultra-clear soda-lime float glass manufactured by Starphire). In some embodiments, the support surface 112 may include markings or other visual indicators that indicate the proper placement of the tire bead 110 during the process of determining a parameter. The transparent body 114 may be held by a frame 120.

A background surface 118 may be included below the support surface 112. In one non-limiting example, the background surface 118 may be substantially parallel to the support surface 112 and may be spaced approximately 4 inches from the support surface 112 (though any other suitable spacing may be used). The background surface 118 is preferably viewable from the perspective of a first measurement device 150, which may include a first camera 130. In addition to, or in the alternative to, the first camera 130, the first measurement device 150 may include any other non-contact detection or measurement device (e.g., an optical sensor or the like). A backlight may be included to illuminate the background surface. In some embodiments, the background surface 118 is defined by a backlight. The background surface 118 may be configured for optimal compatibility with the first camera 130. For example, the background surface 118 may be uniformly polished, may include a particular color, or may include other visual or other indicia that the first camera is particularly sensitive to.

The first camera 130 may be a high-resolution camera, such as a 29 megapixel Allied Vision Technologies high resolution camera with an entocentric lens such as an Edmund Optics 35 mm F-Mount lens. The first camera 130 may have any other suitable type of lens (e.g., a telecentric lens). The first measurement device 150 may additionally include image recognition and processing software, and/or may be electrically connected to a computer 156 configured to recognize and process image data provided by the first camera 130, to obtain a measurement. For example, the first camera 130 and the associated image recognition and processing software of the first measurement device 150 and/or the computer 156 may be configured to recognize and measure any breaks or discontinuities in the view of the background surface 118 from the perspective of the lens of the first measurement device 150 may be calibrated with respect to the support surface 112. For example, each pixel of an image provided by the first camera 130 may be associated with a particular distance that is determined and/or set during calibration.

To illustrate, the first camera 130 may face the support surface 112 and the background surface 118 such that at least a portion of the support surface 112 and at least a portion of the background surface 118 are within the field of view of the first camera 130. When a tire bead 102 or other component is placed on the support surface 112, at least a portion of the background surface 118 (which, as described above, may be backlit) may be blocked from view by the first camera 130. The image viewed by the first camera is illustrated by image 210 with a field of view 131 of FIG. 2. It is noted that the image 210 may only exist in the form of data (for example inside the measurement device 150 or the computer 156).

Figure 2:
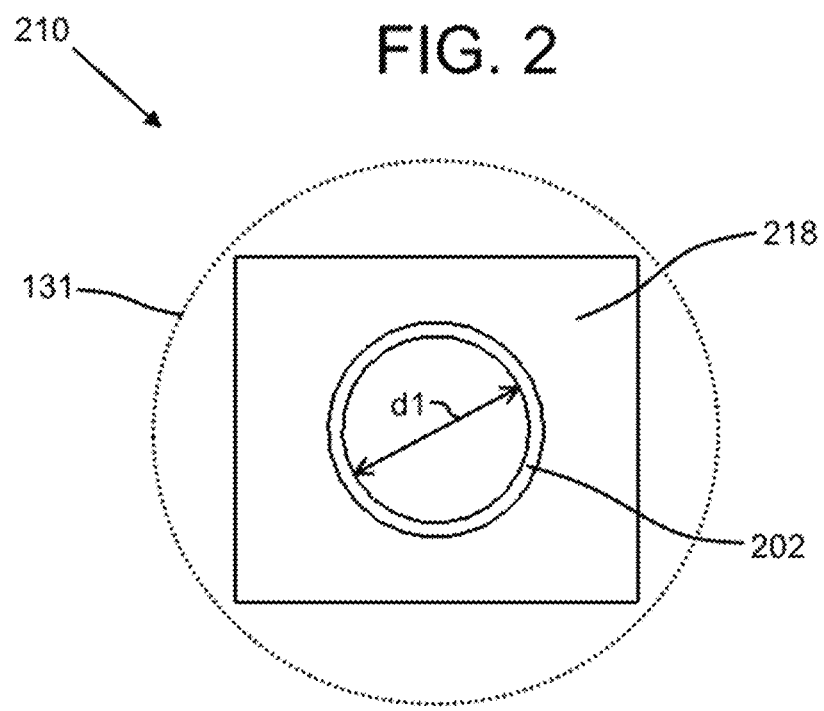
FIG. 2 shows a view from the perspective of a camera with an entocentric lens when viewing a tire component located on a support surface of the embodiment of the system of FIG. 1.

The first measurement device 150 may be configured to utilize software to measure a dimension d1, which corresponds to the inner diameter parameter of the tire bead 102. With reference to FIG. 2, the first portion 218 of the image 210 corresponds to the unblocked portion of the background surface 118 from the perspective of the first camera 130, and the second portion 202 corresponds to the portion of the background surface 118 blocked from view by the tire bead 102. The measurement device 150 and/or the computer 156 may, for example, recognize the dimension depicted as the dimension d1 and determine its length. The first camera 130 and/or the computer 156 may additionally or alternatively be configured to recognize and measure any other dimension.

In some embodiments, the first camera 130 may have an entocentric lens providing a conical field of view (shown as the field of view 131). Advantageously, an entocentric lens typically has a large maximum working distance (i.e., the maximum distance from the lens of the first camera 130 to the component being measured). Further, the entocentric lens may be capable of viewing a large area (particularly when placed at a relatively large distance from the support surface 112, as the viewing area will increase with distance), thereby providing the ability for the system 110 to view and measure many different types and sizes of tire beads 102. In one non-limiting embodiment (for illustrative purposes only), the entocentric lens of the first camera 130 may be placed approximately 36 inches from the support surface 112, and the system 110 may be capable of measuring beads having an inner diameter ranging from approximately 12 inches to approximately 25 inches. Advantageously, many different types and sizes of beads may be measured using the first camera 130 without significant repositioning or replacement of the components of the system 110.

The magnification effects (e.g., the reduced apparent size with increased distance) of an entocentric lens may require a measurement correction when the dimension d1 (of FIG. 2) is measured to determine the inner diameter parameter of the tire bead 102, for example when the minimum inner diameter of the tire bead 102 is not directly adjacent to the support surface 112 (e.g., when the tire bead 102 has a circular cross-section such that the minimum inner diameter is a certain height above the support surface 112). When certain variables are known (e.g., the distance from the camera lens to the support surface 112 and height of the measured dimension above the support surface 112), the measured dimension can be converted to determine the parameter by using principles of trigonometry. In one example, the dimension d1 of FIG. 2 corresponding to the inner diameter of the tire bead 102 can be measured by the first measurement device 150, as described above. The dimension d1 can then be incorporated into a mathematical sequence to determine the true size of the inner diameter parameter of the tire bead 102. For example, when the perceived radius of the dimension d1, the distance of the tire bead 102 to the first camera 130, and the height of the minimum inner diameter above the support surface 112 are known, trigonometry may be used to determine the actual inner diameter parameter of the tire bead 102.

Referring to FIG. 1, the system 110 may additionally include a second measurement device 152 with a second camera 132 and/or a third measurement device 154 with a third camera 134. As depicted in FIG. 1, the second camera 132 of the second measurement device 154 is oriented such that its field of view is substantially parallel to the field of view 131 of first camera 130, though this is not necessarily required in all embodiments. Like the first camera 130, the second camera 132 may utilize the background surface 118. The measurement device 152 may be configured to determine a second parameter of the tire bead 102, such as the height of the tire bead 102 as shown.

The second camera 132 may be a camera with a telecentric lens for directly measuring the second parameter (e.g., the height) of the tire bead 102. A telecentric lens is capable of producing an orthographic view of its subject without magnification, and therefore the image magnification may be independent of the distance or position of the subject. One example of a telecentric lens that may be used is a TCCR23056 lens manufactured by Opto Engineering. The telecentric lens of the second camera 132 may be positioned above the support surface 112 such that the tire bead 102 will fall within the working range (which, for example, may be from about 1.5 inches to about 4.5 inches) of the telecentric lens when placed on the support surface 112. Accordingly, the telecentric lens of the second camera 132 may directly measure the second parameter (e.g., height) of the tire bead 102. Herein, the phrase "directly measure" means that a measurement may be accomplished without correcting for magnification due to distance from a lens. This direct measurement may also be independent from the position of the tire bead 102 with respect to the field of view of the second camera 132. Advantageously, using a second camera 132 with a telecentric lens may minimize the necessity for precise placement of the tire bead 102 prior to the measurement of the second parameter, and may allow the system 110 to operate to determine the second parameter of multiple sizes and variations of the tire bead 102. Measurement devices utilizing telecentric lenses are also typically capable of achieving highly-accurate measurements.

A third camera 134 of a third measurement device 154, shown in FIG. 1, may be oriented such that its field of view is substantially perpendicular to the field of view of the second camera 132 and the first camera 130. The third measurement device 154 may be configured to determine a third parameter of the tire bead 102 (e.g., a width of the tire bead 102). Like the second camera 132, the third camera 134 may have a telecentric lens such that the third measurement device 154 is capable of directly measuring the third parameter. Advantageously, providing a third camera 134 with a telecentric lens may allow for the direct determination of the third parameter of the multiple sizes and variations of the tire bead 102 and without the precise positioning of the tire bead 102 on the support surface 112. In some embodiments, an extension 136 with a second background surface 138 may be provided. The second background surface 138 may be located generally in the field of view of the third camera 134 and may be configured for optimal compatibility with the third camera 134 and to provide contrast with respect to the tire bead 102. Like the first background surface 118, the second background surface 138 may be backlit and/or may be defined by a backlight.

Figure 3:
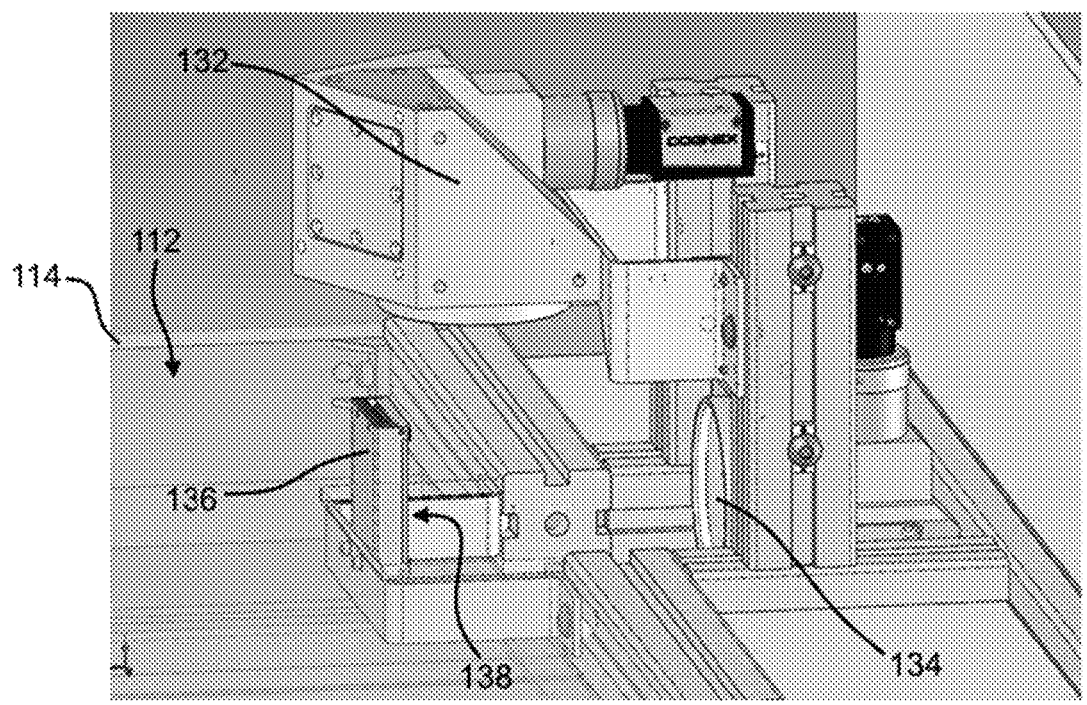
FIG. 3 shows a perspective view of a portion of a system for determining a parameter of a tire component, where the system comprises an extension with a second background surface.

In some embodiments, referring to FIG. 1, the system 110 may include one or more positioning devices, such one or more abutment surfaces 122 and 124. The abutment surfaces 122 and 124 may be included on the frame 120 which at least partially supports the transparent body 114. In addition, or alternatively, an extension may be provided from the support surface 112 (such as extension 136 shown in FIG. 3), which may include at least one abutment surface for properly positioning the tire bead 102. The second camera 132 may be located with respect to the abutment surfaces 122 and 124 such that, when the tire bead 102 is positioned into contact with the abutment surfaces 122 and 124, the tire bead 102 is substantially aligned with the field of view of the second camera 132 such that the second camera 132 can measure the second parameter (e.g., the height) of the tire bead 102. Advantageously, the abutment surfaces 122 and 124 may provide simplicity in positioning the tire bead 102 correctly on the support surface 112 in a measurement system such that the system 110 can obtain measurements, thereby providing increased manufacturing efficiency and increased accuracy of the measurement results. Further, the third camera 134 may be positioned such that the tire bead 102 is at a distance within the working range of the lens of the third camera 134 when in contact with the abutment surfaces 122 and 124. For example, this may be accomplished when the third camera 134 is positioned at least partially between two frame members 126 and 128 having the respective abutment surfaces 122 and 124, as shown.

It is contemplated that the position of the third camera 134 may be vertically adjustable (manually or automatically) to correspond with the width of the tire bead 102 (e.g., when a tire bead 102 with a relatively large width is measured, the third camera 134 may be adjusted upward to ensure the entirety of the width of the tire bead 102 is within view of the telecentric lens of the third camera 134). Alternatively, the position of the support surface 112 may be adjustable. In some embodiments, the size of the field of view of the third camera 134 may be sufficient such that this vertical adjustment is unnecessary.

The system 110 may have a measurement device configured to measure the mass or weight of a component placed on the support surface 112 (e.g., the tire bead 102). For example, as shown in FIG. 1, at least one load cell 170 may be operably connected to the support surface 112. The load cell 170 may be placed underneath the frame 120, which supports the transparent body 114. In exemplary embodiments, one load cell may be placed under the frame 120 supporting the transparent body 114 at positions corresponding to each of the four corners of the transparent body 114. When multiple load cells are used, the sum of the forces on the calibrated load cells (i.e., the total force minus the weight force provided on the load cells when no component is placed on the support surface 112) will correspond to the weight of the tire bead 102 (and/or another component) placed on the support surface 112. The load cells may provide the measured weight to the computer 156.

In some embodiments, and as depicted by FIG. 4, the system 110 may include a body 160 with a cavity 162. As shown, the support surface 112 may define at least a portion of the bottom of the cavity 162. The first camera 130 (described above with reference to FIG. 1) may be located adjacent to the top of the cavity 162. The second and third cameras 132 and 134 (described above with reference to FIG. 1) may be located within the cavity 162 or may be located out of the cavity 162 but face towards the cavity 162 to view a component on the support surface 112. The cavity 162 may include a door (not shown) that may close during the measurement of the tire bead 102 or other component. Advantageously, enclosing the cavity 162 during the measurement of at least one parameter may substantially keep ambient light from the cavity 162. The backlights described above may therefore be substantially the only source providing light within the cavity 162. This may decrease interruption by ambient light and increase the accuracy and precision of the above-described measurement devices. It is contemplated that the walls and other surfaces within the cavity 162 may be optimized such that reflections of the light provided by the backlights are substantially eliminated or otherwise do not interfere with the operation of the cameras.

It is contemplated that, in some embodiments, the system 110 described above may be a part of a larger assembly line where tire beads are placed on the support surface 112 (of FIG. 1) automatically, for example through the use of a conveyor system. Further, in some embodiments, the body 160 of the system 110 (shown in FIG. 4) may have castors and therefore may be movable, which may be advantageous for storage and portability in a manufacturing environment.

The current embodiments are advantageous, as they may provide the measurement of physical parameters of a tire component (such as the inner diameter, height, width, and weight of a tire bead) without distorting its form during the measurement process. This results in a highly accurate and precise measurement. Further, a single system can be utilized to measure the parameters of a variety of different sized components. Further, the tire component may be easily and quickly placed into the system and removed.

We claim:

1. A system for determining at least one parameter of a tire component, the system comprising:
   a background surface;
   a first measurement device configured to measure a dimension on the background surface; and
   a support surface located at least partially between the first measurement device and the background surface, the support surface configured to support the tire component,
   wherein the support surface is at least partially transparent such that the first measurement device detects light illuminating the background surface,
   wherein the background surface is located below the support surface such that the background surface is spaced from the support surface, and
   wherein the tire component comprises a first parameter, and wherein the first parameter corresponds to the dimension viewed with respect to the background surface by the first measurement device via detection of the light illuminated from the background surface.

2. The system of claim 1, wherein the first measurement device comprises a first camera with an entocentric lens.

3. The system of claim 2, further comprising a second measurement device configured to directly determine a second parameter of the tire component.

4. The system of claim 3, wherein the second measurement device comprises a second camera having a telecentric lens.

5. The system of claim 4, further comprising a third measurement device, the third measurement device comprising a third camera having a telecentric lens, wherein the third measurement device is configured to determine a third parameter of the tire component.

6. The system of claim 1, further comprising at least one load cell positioned at least partially between the background surface and the support surface and configured to measure the weight of the tire component.

7. The system of claim 1, further comprising an abutment surface, wherein the abutment surface is configured to locate the tire component in a measurement position.

8. A system for determining at least one parameter of a tire bead, the system comprising:
- a support surface for supporting the tire bead; and
- at least one non-contact measurement device, the at least one non-contact measurement device configured to measure a first dimension corresponding to a first parameter of the tire bead and a second dimension corresponding to a second parameter of the tire bead while the tire bead is supported by the support surface; and
- a background surface, wherein the at least one non-contact measurement device is configured to measure a dimension viewed on the background surface by the at least one measurement device,
- wherein the background surface is spaced vertically relative to the support surface, and
- wherein the support surface is at least partially transparent such that the at least one non-contact measurement device detects light illuminating the background surface during measurement.

9. The system of claim 8, wherein the at least one measurement device comprises a first camera with an entocentric lens.

10. The system of claim 8, wherein the distance between the background surface and the support surface is at least about 4 inches.

11. The system of claim 8, wherein the at least one measurement device comprises a first measurement device and a second measurement device, and wherein the second measurement device is configured to directly determine the second parameter of the tire bead without contacting the tire bead.

12. The system of claim 11, wherein the second measurement device comprises a second camera having a telecentric lens.

13. The system of claim 8, further comprising a load cell operably coupled to the support surface.

14. A method of determining a parameter of a tire component, the method comprising:
- supporting the tire component on a support surface;
- viewing a background surface with a first camera, wherein the support surface is located at least partially between the background surface and the first camera, and wherein the background surface is located below the support surface such that the background surface is spaced from the support surface;
- measuring a first dimension of a blocked portion of the background surface from the perspective of the first camera, wherein the support surface is at least partially transparent such that the first measurement device detects light illuminating the background surface during measurement; and
- determining a first parameter based on the first dimension.

15. The method of claim 14, wherein the camera comprises an entocentric lens.

16. The method of claim 14, further comprising directly measuring a second parameter of the tire component with a second measurement device.

17. The method of claim 16, wherein the second measurement device comprises a camera with a telecentric lens.

18. The method of claim 14 further comprising measuring the weight of the tire component with a load cell, the load cell being operably coupled to the support surface.

* * * * *